May 12, 1942.                M. EWALD                2,282,326
                            CORING DEVICE
                    Original Filed Feb. 15, 1934

INVENTOR
MARK EWALD
BY
ATTORNEY

Patented May 12, 1942

2,282,326

UNITED STATES PATENT OFFICE 2,282,326

CORING DEVICE

Mark Ewald, Olympia, Wash., assignor to Special Equipment Company, Portland, Oreg., a corporation of Oregon Original application February 15, 1934, Serial No. 711,355. Divided and this application October 5, 1934, Serial No. 746,952. Renewed December 22, 1937

19 Claims. (Cl. 146—52)

This invention has to do with a coring device or spoon for use in the removal of the central axial portion of a fruit and relates more particularly to the process of manufacturing such a spoon.

A coring spoon made by the process hereinafter described is preferably but not necessarily adapted for use in a fruit treating machine which operates to halve, core and peel fruit anterior to its being placed in cans or otherwise packed for preservation or for sale. In part, such a fruit treating machine may if desired, comprise a slotted member having journals at opposite sides of the slot for rotatively carrying a coring spoon of the present type. After the fruit has been sliced in half along its longitudinal axis, the fruit halves that are formed as a consequence of the splitting operation are arranged to present their flat faces respectively to the fruit pad so that the pad may be carried into contact therewith. When the pad is firmly engaged with the plane face of the half-fruit portion, means becomes effective to rotate the coring spoon from the pad into the face of the fruit and about the core section thereof to separate it from the fruit.

For a more comprehensive description of the fruit treating machine and coring device, in which the coring spoon made by the present process is adapted for use, reference may be had to the following co-pending applications of the applicant:

The construction of the present application and the claims thereof are drawn to improvements in the coring devices disclosed in my pending applications serially numbered 614,062, filed May 28, 1932, which has matured into Patent No. 2,231,002 granted February 11, 1941; Serial Number 636,447 filed October 6, 1932; and Serial Number 637,708, filed October 14, 1932, which has matured into Patent No. 2,242,241 granted May 20, 1941.

The present application is a division of my prior application Serial Number 711,355, filed February 15, 1934, which has matured into Patent No. 2,072,103 granted March 2, 1937, the claims of which are limited to the process of forming a coring device of the present construction. The claims herein are restricted to the article formed preferably by such process.

Objects of the present invention include the provision of a novel coring spoon for the removal of the core section of a fruit by rotative movement, as well as the removal of the relatively hard threads that lie on either side of the core and the stem and blossom of the fruit.

These objects and such other objects as may hereinafter appear are obtained by the novel construction, unique arrangement and improved combination of elements illustrated in the accompanying single sheet of drawings, hereby made a part of this specification, and in which.

Figure 2:
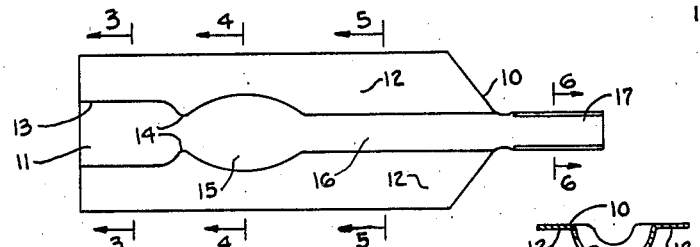
Figure 2 is a plan view of the blank of Figure 1 after subjection to one operation of the process of its manufacture.
Figure 3:
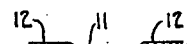
Figure 4:
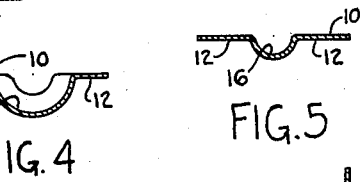
Figure 5:
Figure 7:
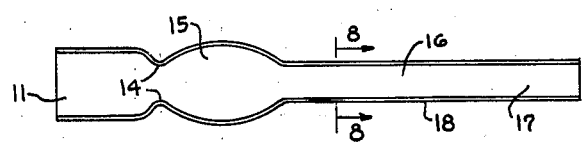
Figure 8:
Figure 9:
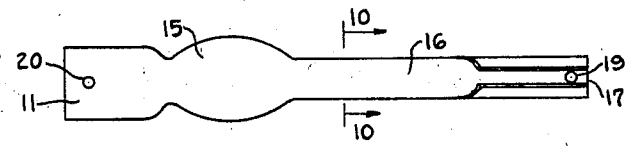
Figure 10:
Figure 11:
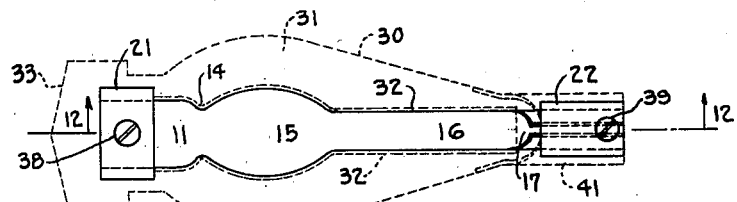
Figure 12:
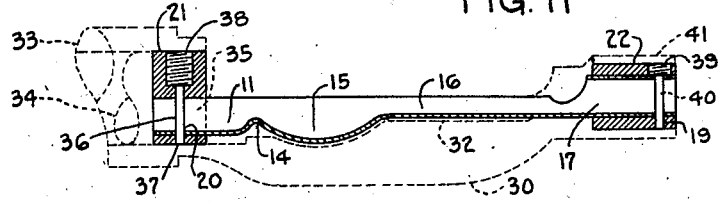

Figures 3, 4, 5 and 6 are transverse sections taken respectively at the lines 3—3, 4—4, 5—5 and 6—6 of Figure 2;

Figure 7 is a plan view of the blank subsequent to the succeeding step of the process of manufacture;

Figure 8 is a cross sectional view taken at the line 8—8 of Figure 7;

Figure 9 is a perspective view of the coring spoon after a later step of the process has been performed in the making thereof;

Figure 10 is a cross sectional view taken at the line 10—10 of Figure 9 to illustrate the manner in which the coring blade is sharpened and given a circular periphery;

Figure 11 illustrates a fruit pad with which the coring spoon is adapted for combined use in a fruit treating machine; and Figure 12 is a central cross sectional view of the coring spoon taken at the line 12—12 of Figure 11.

Figure 1:
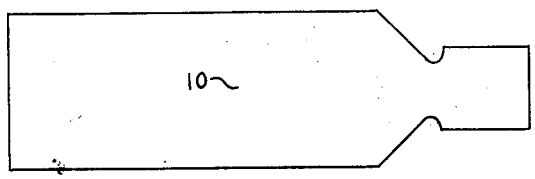
Figure 1 is a plan view of a blank of metal from which a coring spoon may be formed by following the successive steps of the present process.

Like reference characters are used to designate similar parts in the drawing and in the description of the invention which follows:

The first step in the process of manufacture of a coring blade of the present type consists in the forming of a flat blank of suitable metal shaped as that illustrated in Figure 1. Most frequently the blank 10 will be obtained by stamping it from a larger piece of sheet metal. When a suitable die is used, more than one of the blanks 10 may be formed in a single operation.

Next the blank 10 may be subjected to stamping means for deforming its longitudinal central portion in the manner illustrated in Figures 2, 3, 4, 5, and 6. The trough-like section 11 comprises substantially semi-circular transverse sections throughout its length and extends from end to end across the face of the blank 10. Wing-like sections 12 to either side of section 11 remain in their original relative position to one another, that is, within a single plane. The deformed section 11 consists of five distinct portions designated by the ordinals 13, 14, 15, 16 and 17. In the completed article, sections 13 and 17 provide attaching means for bearing members; section 14 is shaped to register with and sever the calix section from the fruit; section 15 is shaped for cutting the core proper from the fruit; and section 16 is designed to cut the thready portion from the axial part of the fruit.

After shaping the blank 10 as shown in Figure 2, it is then trimmed of the wing-like sections 12. This may be done by subjecting the blank to a properly designed die member. A narrow section of the wing-like sections 12 and designated 18 in Figures 7 and 8, is left along the edges of the deformed section 11, the narrow section providing material for a cutting edge of the spoon as will be made apparent presently. The member 10 is now treated to curl the sides of the U-shaped section 17 inwardly to make the section circular. Ample space may be left between the opposed edges of the curled section to permit of the insertion of a drill for effecting an aperture 19. At this time an aperture 20 may be made in the opposite end of the member 10. Apertures 19 and 20 provide means of attachment for bearing members 21 and 22.

The coring spoon is thus provided with a central portion 15 which is enlarged for the purpose of removing the core proper, while the two sections 11 and 16 on opposite sides thereof are shaped to sever the strings which extend between the core and the blossom end of the fruit and between the core and the stem bearing end of the fruit, respectively. It will be seen that by rotating the coring spoon in a single rotation it will remove not only the core proper but also all of the strings between the blossom and stem end of the fruit and will form a clean concavity centrally through the fruit and parallel with the stem axis of the fruit, thus giving a clean, symmetrical appearance to the half pear when the core is thus removed.

The member 10 may now be properly termed a "spoon," although the cutting edges have not been formed as yet. Before sharpening the edges of the spoon it is first heated and quenched in oil for tempering to produce the desired hardness. Stainless cutlery steel has proven to be a satisfactory material from which to make the spoon. After tempering, the spoon is attached to an arbor in a manner adapting it to be rotated about its longitudinal axis. An examination of Figure 10 will show the axis to pass centrally of the section 17 and half way between the projecting portions 18 substantially within a plane common therewith. While the spoon is being rotated about its axis a suitable grinding or abrasive instrumentality is carried thereto and moved back and forth between sections 13 and 17. In this manner the outer periphery of the spoon is removed to make the transverse sections thereof circular with respect to the axis of rotation and, concurrently, a cutting edge is formed along the opposed longitudinal edges of each section of the spoon.

An examination of Figures 2, 7, 9 and 10 will make it apparent how the inner periphery of the spoon, along its opposed edges, is curved outwardly. This is due to the action of the swage means employed for shaping the blank as it is illustrated in Figure 2. By leaving the slight projection 18 along the edges of the spoon at the time of trimming the wings 12, the outwardly flared portion of the internal periphery is permitted to extend to and beyond the external periphery as it lies at a point just beneath the portion 18. Thus when the exterior of the spoon is ground down to make it circular, the greater part of the flanged portion 18 will be removed and the cutting edge will be formed flush with the outer periphery of the spoon. By arranging the cutting edge in this way a clean cut is made within the body of the half fruit as the spoon is rotated thereinto and so as to clear a space for the body of the knife. Consequently, the spoon does not press against the wall of the cavity created thereby within the fruit. Should the cutting edge be formed between the inner and outer surfaces of the wall of the spoon, there would be a slight wedging action of the body of the spoon against the side of the cavity along a narrow section just back of the advancing edge. When wedging of this nature occurs the fruit is slightly mutilated and in some instances small pieces will be torn from a fruit.

Figures 11 and 12 show a slotted fruit pad 30 having a flat face 31 for engaging the flat face of a half fruit. Normally the spoon 10 will be retracted into the groove 32 of the pad and the axis of rotation of the spoon will lie within the plane face of the pad. Thus, as the spoon is rotated about its axis, it will be carried out of the pad and about the axial portion of the engaged fruit.

The shank 33 of the pad member 30 may be hollow to contain a spindle 34 having a lug 35 semicircular in cross section to project into the bearing member 21 for the rotation thereof and the spoon. An aperture 36 may be placed in the lug 35 or a slot in the end thereof to receive the pin portion 37 of a set screw member 38, the latter being for holding the spoon, bearing member 21, and the spindle 34 in assembly. For attaching the bearing member 22 to the opposite end of the spoon a screw 39 having a pin portion 40 may be used. A bearing 41 at the extended end of the pad rotatively contains the bearing member 22. Means (not shown) connected to the shank 33 of the pad and the spindle 34 may be employed to rotate the spoon and pad relatively or in concert.

A truly cylindrical outer spoon wall has been found by test to be essential for successful coring operations. A spoon should revolve through the fruit without undue or irregular pressure. If such spoon is not truly circular, there will be irregular or undue pressure, and a fracture of the fruit may occur either during the coring operation itself or the structure of the pear may be weakened so that a fracture occurs after the fruit has been placed in the can. A study of spoon structure followed by the conception of the present truly cylindrical form of spoon has resulted from a discovery that fruit heretofore packed has frequently split in the cans. From this came a study out of which the present structure was conceived. Fruit which has been cored by the present form of spoon so far has shown no tendency to split.

Another reason for employing a spoon that is truly cylindrical resides in the discovery that superior operation is had when the least amount of pressure is applied upon the adjacent plane surfaces of the fruit. By employing a truly cylindrical spoon, the pressure of the coring paddle with which it is generally associated may be reduced to a minimum. As the coring spoon is inserted into the fruit, the material of the fruit at the interior of the spoon and toward the axis of the fruit is broken away but that to the exterior of the spoon does not. Since the part that is broken away is upon the interior and rejected portion of the fruit and is confined in no way, the rupture of the fruit cells in the direction of the core has no undesirable effect upon the recovered body of the fruit.

The spoon possesses no tendency, because it is truly cylindrical, to exert an uneven pressure at any section of the fruit maintained in a cup or other sustaining member during the coring operation because there is no change in the confining pressure exerted upon the fruit at any radial portion of the spoon. Fruit which has been cored with a truly circular coring spoon has been found to present a smoother appearance internally and to be less susceptible to splitting than when the coring has been accomplished by other means.

What is claimed as new and is desired to be secured by Letters Patent of the United States is:

1. A coring device for coring half fruit curved throughout the major portion of its length to an elongated shape semicylindrical in cross-section, a portion of the length intermediate the ends of the device being of increased radii, each end having integral extensions curved to a shape substantially circular in cross-section to provide substantially circular mountings for bearings for rotation of the device, at least one of the edges of the semi-cylindrical portion throughout its length being sharpened and the entire outer surface of the semicylindrical portion and corresponding to the length of the cutting edge being formed as a true semi-circle.

2. A coring device for coring half fruit formed of sheet metal curved throughout the major portion of its length to an elongated shape semicylindrical in cross-section, the end portions of the semi-cylindrical portion being formed as integral mountings having a common axis of rotation intermediate portions of the semi-cylindrical shape being of varying radii, the elongated opposed free edges of the semi-cylindrical portion lying in a plane passing through said axis of rotation and at least one of said edges being sharpened to provide a cutting edge.

3. A coring device for coring half fruit formed of sheet metal curved throughout the major portion of its length to an elongated shape semicylindrical in cross-section, the end portions of the semi-cylindrical portion being formed as integral mountings having a common axis of rotation, the elongated opposed free edges of the semi-cylindrical portion lying in a plane passing through said axis of rotation and at least one of said edges being sharpened to provide a cutting edge, a portion of the semi-cylindrical shape adjacent one of the ends being of increased radii, the remainder of the semi-cylindrical shape from said portion of increased radii to the other end of the shape being of lesser radii than that end of the semi-cylindrical shape adjacent the portion of increased radii.

4. In a coring device, a spoon for coring a half fruit comprising an elongated metallic body having portions along its length of varying radii about a common center, the external surface of said body being truly cylindrical and a section of the internal surface adjacent the longitudinal edge of said body being beveled to provide a cutting edge coincident with the exterior surface of the body.

5. A coring device for coring half fruit comprising an elongated metal sheet of substantially semi-cylindrical cross-section throughout and formed for a greater portion of its length of varying radii from a common center, said portions of different radii corresponding to sections of the body of an average pear enclosing the core, the axially extending threads, and the blossom end respectively, said semi-cylindrical portion having a free elongated sharpened edge for cutting the various portions of the half fruit when said half cylinder is rotated about the common center of said portions of varying radii.

6. A coring spoon for coring half fruit comprising a substantially semi-cylindrical body formed at its opposed ends with mountings having a common axis of rotation about which the body is adapted to be turned, the free opposed elongated edges of said semi-cylindrical portion passing substantially through a plane passing through said axis of rotation, said semi-cylindrical portion having a part of enlarged radius to provide a substantially semi-cylindrical scoop-like portion for cutting the core, the scoop-like portion being joined to one of the semi-cylindrical ends by a portion of restricted diameter to provide a cutter for the calix of the fruit, said semi-cylindrical portion at the opposite end of the scoop-like portion having elongated walls of uniform radius for cutting the parallel threads of the fruit between the core and the stem portions of the fruit.

7. A coring spoon for coring half fruit comprising an elongated shell of substantially semi-cylindrical cross-section throughout the major portion of its length and having its opposed ends formed with means for supporting the body for rotation about an elongated axis, the free edges of the semi-cylindrical body being in a plane passing through the axis of rotation and at least one being sharp, said semi-cylindrical body having portions of varying radii providing an enlarged scoop-like bulge to cut the core proper, an adjoining restricted neck to cut the calix and a portion for cutting the threads between the core and the stem.

8. A rotatable coring blade comprising an integral, elongated semi-cylindrical body with an intermediate core cutting section and end cutting sections, the body at the central section being of greatest radius and converging at each end of said intermediate section into said end sections, the cutting edge of said blade being coextensive with an edge of said body.

9. A rotatable coring blade comprising an integral, semi-cylindrical body having its end portions formed as bearings to permit the rotation of the coring blade, the blade in cross section between its ends being provided with an enlarged portion of suitable size to remove the core proper of a pear and being provided on one side of said enlarged portion with a relatively long portion of less diameter and of sufficient length to remove the substantially centrally located threads disposed between the core proper and the stem end of the pear and being provided at the other end of the core portion proper with an oppositely extending semi-cylindrical portion of restricted cross section to remove the blossom end of the pear, whereby upon rotation the core proper and the threads lying centrally of the pear between the core proper and the stem and the core proper and the blossom will be removed by a single cut.

10. A rotatable coring device for pears comprising means comprising an elongated body having its ends formed with cylindrical portions to provide rotatable bearings, the body intermediate said bearings providing a cutting edge extending continuously from one bearing to the other, said cutting edge at a relatively short distance from one of said bearings providing a portion of arcuate formation in a direction substantially parallel to the axis of turning and of maximum radius from said axis of turning whereby to cut the core proper of the pear, said cutting edge between said portion of maximum radius and the adjacent bearing being of lesser radius and joining said portion of maximum radius by a constricted portion whereby to provide means for simultaneously cutting the calyx of the pear, said cutting edge between the opposite bearing and the portion of maximum diameter being substantially parallel with the axis of turning and being constructed and arranged to cut the threads or strings of the pear between the core proper and the stem end of the pear.

11. A rotatable coring blade comprising an elongated body having an outer wall curved transversely of its length and substantially coextensive with its length to form a portion of a true cylinder, one of the longitudinal edges of the curved wall being sharpened to form a cutting edge and the cutting edge being flush with the outer periphery of said wall.

12. A coring spoon for pears comprising an elongated body having its ends formed to receive circular bearings for rotation about a common axis, said body in planes transversely of its length and at various portions therealong being of varying radii from said common axis and curved to provide outer wall portions forming true circular arcs about said axis of rotation.

13. A coring spoon for coring half fruit comprising an elongated relatively thin metal body having its opposite ends shaped to receive bearings for rotating the spoon, one of the longitudinal edges of said spoon being sharpened and formed to sever the calyx with the core proper, said body being curved transversely of its length to provide sufficient rigidity, the curvature of said body adjacent the calyx severing end being reduced in diameter to reduce the amount of flesh severed from the half fruit between the calyx and the core proper.

14. A coring spoon for coring half fruit, comprising an elongated metal body having its opposed ends shaped to receive bearings for rotating the spoon, one of the longitudinal edges of said spoon being sharpened to form a cutting edge, said cutting edge adjacent one end of the body being curved inwardly to reduce the amount of flesh severed from the half fruit between the calyx and the core proper.

15. A rotatable coring blade for a half fruit comprising an elongated body having an outer wall curved transversely and substantially coextensively with its length to form a portion of a true cylinder, one of the longitudinal edges of the curved wall being sharpened to form a cutting edge to sever the core proper and calyx, said outer wall adjacent one of said ends being reduced in diameter to reduce the amount of flesh severed from the half fruit between the calyx and the core proper.

16. A coring spoon for coring half fruit comprising an elongated body having its opposed ends provided with bearings about whose common axis the spoon is adapted to rotate, one of the longitudinal edges of said spoon being sharpened, said body coextensive with its cutting edge being curved transversely sufficiently to receive all of the severed core.

17. A coring spoon for coring half fruit comprising an elongated body having its opposed ends provided with bearings about whose common axis the spoon is adapted to rotate, one of the longitudinal edges of said spoon being sharpened, said body coextensive with its cutting edge being curved transversely sufficiently to receive and to retain therein the severed core during a considerable portion of the rotation of the spoon about said common axis.

18. A coring spoon for half pears having its ends formed to receive bearings about which the the spoon is adapted to turn, the spoon between its ends providing a continuous cutting edge for simultaneously cutting the threads, core proper and the calyx of the half pear, the body of the spoon coextensive with its cutting edge and transversely thereof being curved to form a concave scoop-like portion of sufficient peripheral extent to receive all of the severed core therein.

19. A coring spoon for half pears having its ends formed to receive bearings about which the spoon is adapted to turn, the spoon between its ends providing a continuous cutting edge for simultaneously cutting the threads, core proper and the calyx of the half pear, the body of the spoon coextensive with its cutting edge and transversely thereof being curved to form a concave scoop-like portion of sufficient peripheral extent to receive all of the severed core therein, the free longitudinal edges of said spoon coextensive with its cutting edge being spaced apart sufficiently to provide a relatively wide opening permitting discharge of said core therethrough.

MARK EWALD.